US007161728B2

(12) United States Patent
Sampsell et al.

(10) Patent No.: US 7,161,728 B2
(45) Date of Patent: Jan. 9, 2007

(54) AREA ARRAY MODULATION AND LEAD REDUCTION IN INTERFEROMETRIC MODULATORS

(75) Inventors: Jeffrey Brian Sampsell, San Francisco, CA (US); Clarence Chui, San Mateo, CA (US); Manish Kothari, Redwood City, CA (US)

(73) Assignee: IDC, LLC, San Francisco, CA (US)

( * ) Notice: Subject to any disclaimer, the term of this patent is extended or adjusted under 35 U.S.C. 154(b) by 0 days.

(21) Appl. No.: 10/731,989

(22) Filed: Dec. 9, 2003

(65) Prior Publication Data
US 2005/0122560 A1 Jun. 9, 2005

(51) Int. Cl.
G02B 26/00 (2006.01)
G02B 27/00 (2006.01)
G02F 1/07 (2006.01)
G09G 3/34 (2006.01)
G01B 9/02 (2006.01)

(52) U.S. Cl. ............... 359/291; 359/247; 359/578; 345/85; 356/454

(58) Field of Classification Search .......... 359/198, 359/223, 224, 290–292, 298, 247, 577, 578; 345/85, 598, 599, 600; 356/454, 579
See application file for complete search history.

(56) References Cited
U.S. PATENT DOCUMENTS

| 2,534,846 | A | 12/1950 | Ambrose et al. |
|---|---|---|---|
| 3,439,973 | A | 4/1969 | Paul et al. |
| 3,443,854 | A | 5/1969 | Weiss |
| 3,653,741 | A | 4/1972 | Marks |
| 3,656,836 | A | 4/1972 | de Cremoux et al. |
| 3,813,265 | A | 5/1974 | Marks |
| 3,955,880 | A | 5/1976 | Lierke |
| 4,099,854 | A | 7/1978 | Decker et al. |
| 4,228,437 | A | 10/1980 | Shelton |
| 4,377,324 | A | 3/1983 | Durand et al. |
| 4,389,096 | A | 6/1983 | Hori et al. |
| 4,392,711 | A | 7/1983 | Moraw et al. |
| 4,403,248 | A | 9/1983 | te Velde |
| 4,441,791 | A | 4/1984 | Hornbeck |
| 4,445,050 | A | 4/1984 | Marks |
| 4,459,182 | A | 7/1984 | te Velde |
| 4,482,213 | A | 11/1984 | Piliavin et al. |
| 4,500,171 | A | 2/1985 | Penz et al. |

(Continued)

FOREIGN PATENT DOCUMENTS
EP 0 667 548 A1 8/1995

(Continued)

OTHER PUBLICATIONS

Akasaka, "Three-Dimensional IC Trends," Proceedings of IEEE, vol. 74, No. 12, pp. 1703-1714 (Dec. 1986).

(Continued)

Primary Examiner—Ricky Mack
Assistant Examiner—William Choi
(74) Attorney, Agent, or Firm—Knobbe Martens Olson & Bear LLP

(57) ABSTRACT

A light modulator is arranged as an array of rows and columns of interferometric display elements. Each element is divided into sub-rows of sub-elements. Array connection lines transmit operating signals to the display elements, with one connection line corresponding to one row of display elements in the array. Sub-array connection lines electrically connect to each array connection line. Switches transmit the operating signals from each array connection line to the sub-rows to effect gray scale modulation.

28 Claims, 8 Drawing Sheets

U.S. PATENT DOCUMENTS

| | | | |
|---|---|---|---|
| 4,519,676 A | 5/1985 | te Velde | |
| 4,531,126 A | 7/1985 | Sadones | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |
| 4,662,746 A | 5/1987 | Hornbeck | |
| 4,663,083 A | 5/1987 | Marks | |
| 4,681,403 A | 7/1987 | te Velde et al. | |
| 4,710,732 A | 12/1987 | Hornbeck | |
| 4,748,366 A | 5/1988 | Taylor | |
| 4,786,128 A | 11/1988 | Birnbach | |
| 4,790,635 A | 12/1988 | Apsley | |
| 4,856,863 A | 8/1989 | Sampsell et al. | |
| 4,857,978 A | 8/1989 | Goldburt et al. | |
| 4,900,136 A | 2/1990 | Goldburt et al. | |
| 4,900,395 A | 2/1990 | Goldburt et al. | |
| 4,954,789 A | 9/1990 | Sampsell | |
| 4,956,619 A | 9/1990 | Hornbeck | |
| 4,965,562 A | 10/1990 | Verhulst | |
| 4,982,184 A | 1/1991 | Kirkwood | |
| 5,018,256 A | 5/1991 | Hornbeck | |
| 5,022,745 A | 6/1991 | Zayhowski et al. | |
| 5,028,939 A | 7/1991 | Hornbeck et al. | |
| 5,037,173 A | 8/1991 | Sampsell et al. | |
| 5,044,736 A | 9/1991 | Jaskie et al. | |
| 5,061,049 A | 10/1991 | Hornbeck | |
| 5,075,796 A | 12/1991 | Schildkraut et al. | |
| 5,078,479 A | 1/1992 | Vuilleumier | |
| 5,079,544 A | 1/1992 | DeMond et al. | |
| 5,083,857 A | 1/1992 | Hornbeck | |
| 5,096,279 A | 3/1992 | Hornbeck et al. | |
| 5,099,353 A | 3/1992 | Hornbeck | |
| 5,124,834 A | 6/1992 | Cusano et al. | |
| 5,142,405 A | 8/1992 | Hornbeck | |
| 5,142,414 A | 8/1992 | Koehler | |
| 5,153,771 A | 10/1992 | Link et al. | |
| 5,162,787 A | 11/1992 | Thompson et al. | |
| 5,168,406 A | 12/1992 | Nelson | |
| 5,170,156 A | 12/1992 | DeMond et al. | |
| 5,172,262 A | 12/1992 | Hornbeck | |
| 5,179,274 A | 1/1993 | Sampsell | |
| 5,192,395 A | 3/1993 | Boysel et al. | |
| 5,192,946 A | 3/1993 | Thompson et al. | |
| 5,206,629 A | 4/1993 | DeMond et al. | |
| 5,214,419 A | 5/1993 | DeMond et al. | |
| 5,214,420 A | 5/1993 | Thompson et al. | |
| 5,216,537 A | 6/1993 | Hornbeck | |
| 5,226,099 A | 7/1993 | Mignardi et al. | |
| 5,228,013 A | 7/1993 | Bik | |
| 5,231,532 A | 7/1993 | Magel et al. | |
| 5,233,385 A | 8/1993 | Sampsell | |
| 5,233,456 A | 8/1993 | Nelson | |
| 5,233,459 A | 8/1993 | Bozler et al. | |
| 5,254,980 A | 10/1993 | Hendrix et al. | |
| 5,272,473 A | 12/1993 | Thompson et al. | |
| 5,278,652 A | 1/1994 | Urbanus et al. | |
| 5,280,277 A | 1/1994 | Hornbeck | |
| 5,287,096 A | 2/1994 | Thompson et al. | |
| 5,293,272 A | 3/1994 | Jannson et al. | |
| 5,296,950 A | 3/1994 | Lin et al. | |
| 5,305,640 A | 4/1994 | Boysel et al. | |
| 5,311,360 A | 5/1994 | Bloom et al. | |
| 5,312,513 A | 5/1994 | Florence et al. | |
| 5,323,002 A | 6/1994 | Sampsell et al. | |
| 5,324,683 A | 6/1994 | Fitch et al. | |
| 5,325,116 A | 6/1994 | Sampsell | |
| 5,326,430 A | 7/1994 | Cronin et al. | |
| 5,327,286 A | 7/1994 | Sampsell et al. | |
| 5,331,454 A | 7/1994 | Hornbeck | |
| 5,339,116 A | 8/1994 | Urbanus et al. | |
| 5,355,357 A | 10/1994 | Yamamori et al. | |
| 5,358,601 A | 10/1994 | Cathey | |
| 5,365,283 A | 11/1994 | Doherty et al. | |
| 5,381,253 A | 1/1995 | Sharp et al. | |
| 5,401,983 A | 3/1995 | Jokerst et al. | |
| 5,411,769 A | 5/1995 | Hornbeck | |
| 5,444,566 A | 8/1995 | Gale et al. | |
| 5,446,479 A | 8/1995 | Thompson et al. | |
| 5,448,314 A | 9/1995 | Heimbuch et al. | |
| 5,452,024 A | 9/1995 | Sampsell | |
| 5,454,906 A | 10/1995 | Baker et al. | |
| 5,457,493 A | 10/1995 | Leddy et al. | |
| 5,457,566 A | 10/1995 | Sampsell et al. | |
| 5,459,602 A | 10/1995 | Sampsell | |
| 5,459,610 A | 10/1995 | Bloom et al. | |
| 5,461,411 A | 10/1995 | Florence et al. | |
| 5,489,952 A | 2/1996 | Gove et al. | |
| 5,497,172 A | 3/1996 | Doherty et al. | |
| 5,497,197 A | 3/1996 | Gove et al. | |
| 5,499,037 A | 3/1996 | Nakagawa et al. | 345/89 |
| 5,499,062 A | 3/1996 | Urbanus | |
| 5,500,635 A | 3/1996 | Mott | |
| 5,500,761 A | 3/1996 | Goossen et al. | |
| 5,506,597 A | 4/1996 | Thompson et al. | |
| 5,515,076 A | 5/1996 | Thompson et al. | |
| 5,517,347 A | 5/1996 | Sampsell | |
| 5,523,803 A | 6/1996 | Urbanus et al. | |
| 5,526,051 A | 6/1996 | Gove et al. | |
| 5,526,172 A | 6/1996 | Kanack | |
| 5,526,327 A | 6/1996 | Cordova, Jr. | |
| 5,526,688 A | 6/1996 | Boysel et al. | |
| 5,535,047 A | 7/1996 | Hornbeck | |
| 5,548,301 A | 8/1996 | Kornher et al. | |
| 5,551,293 A | 9/1996 | Boysel et al. | |
| 5,552,924 A | 9/1996 | Tregilgas | |
| 5,552,925 A | 9/1996 | Worley | |
| 5,559,358 A | 9/1996 | Burns et al. | |
| 5,563,398 A | 10/1996 | Sampsell | |
| 5,567,334 A | 10/1996 | Baker et al. | |
| 5,570,135 A | 10/1996 | Gove et al. | |
| 5,579,149 A | 11/1996 | Moret et al. | |
| 5,581,272 A | 12/1996 | Conner et al. | |
| 5,583,688 A | 12/1996 | Hornbeck | |
| 5,589,852 A | 12/1996 | Thompson et al. | |
| 5,597,736 A | 1/1997 | Sampsell | |
| 5,600,383 A | 2/1997 | Hornbeck | |
| 5,602,671 A | 2/1997 | Hornbeck | |
| 5,606,441 A | 2/1997 | Florence et al. | |
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,619,059 A | 4/1997 | Li et al. | |
| 5,619,365 A | 4/1997 | Rhoads et al. | |
| 5,619,366 A | 4/1997 | Rhoads et al. | |
| 5,629,790 A | 5/1997 | Neukermans et al. | |
| 5,636,052 A | 6/1997 | Arney et al. | |
| 5,636,185 A | 6/1997 | Brewer et al. | |
| 5,646,768 A | 7/1997 | Kaeriyama | |
| 5,650,881 A | 7/1997 | Hornbeck | |
| 5,654,741 A | 8/1997 | Sampsell et al. | |
| 5,657,099 A | 8/1997 | Doherty et al. | |
| 5,659,374 A | 8/1997 | Gale, Jr. et al. | |
| 5,665,997 A | 9/1997 | Weaver et al. | |
| 5,673,139 A | 9/1997 | Johnson | |
| 5,683,591 A | 11/1997 | Offenberg | |
| 5,703,710 A | 12/1997 | Brinkman et al. | |
| 5,710,656 A | 1/1998 | Goossen | |
| 5,726,480 A | 3/1998 | Pister | |
| 5,739,945 A | 4/1998 | Tayebati | |
| 5,745,193 A | 4/1998 | Urbanus et al. | |
| 5,745,281 A | 4/1998 | Yi et al. | |
| 5,771,116 A | 6/1998 | Miller et al. | |

| | | |
|---|---|---|
| 5,784,190 A | 7/1998 | Worley |
| 5,784,212 A | 7/1998 | Hornbeck |
| 5,793,504 A | 8/1998 | Stoll |
| 5,808,780 A | 9/1998 | McDonald |
| 5,818,095 A | 10/1998 | Sampsell |
| 5,825,528 A | 10/1998 | Goossen |
| 5,835,255 A | 11/1998 | Miles ................... 359/291 |
| 5,842,088 A | 11/1998 | Thompson |
| 5,912,758 A | 6/1999 | Knipe et al. |
| 5,943,158 A | 8/1999 | Ford et al. |
| 5,986,796 A | 11/1999 | Miles ................... 359/260 |
| 6,028,690 A | 2/2000 | Carter et al. |
| 6,038,056 A | 3/2000 | Florence et al. |
| 6,040,937 A | 3/2000 | Miles ................... 359/291 |
| 6,049,317 A | 4/2000 | Thompson et al. |
| 6,055,090 A | 4/2000 | Miles ................... 359/291 |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,158,156 A | 12/2000 | Patrick |
| 6,160,833 A | 12/2000 | Floyd et al. |
| 6,180,428 B1 | 1/2001 | Peeters et al. |
| 6,201,633 B1 | 3/2001 | Peeters et al. |
| 6,232,936 B1 | 5/2001 | Gove et al. |
| 6,243,149 B1 | 6/2001 | Swanson et al. |
| 6,282,010 B1 | 8/2001 | Sulzbach et al. |
| 6,295,154 B1 | 9/2001 | Laor et al. |
| 6,323,982 B1 | 11/2001 | Hornbeck |
| 6,335,831 B1 | 1/2002 | Kowarz et al. |
| 6,355,831 B1 | 3/2002 | Wu et al. |
| 6,407,851 B1 | 6/2002 | Islam et al. |
| 6,447,126 B1 | 9/2002 | Hornbeck |
| 6,465,355 B1 | 10/2002 | Horsley |
| 6,466,358 B1 | 10/2002 | Tew |
| 6,473,274 B1 | 10/2002 | Maimone et al. |
| 6,480,177 B1 | 11/2002 | Doherty et al. |
| 6,496,122 B1 | 12/2002 | Sampsell |
| 6,545,335 B1 | 4/2003 | Chua et al. |
| 6,548,908 B1 | 4/2003 | Chua et al. |
| 6,549,338 B1 | 4/2003 | Wolverton et al. |
| 6,552,840 B1 | 4/2003 | Knipe |
| 6,574,033 B1 | 6/2003 | Chui et al. ................. 359/291 |
| 6,589,625 B1 | 7/2003 | Kothari et al. ................. 428/46 |
| 6,600,201 B1 | 7/2003 | Hartwell et al. |
| 6,606,175 B1 | 8/2003 | Sampsell et al. |
| 6,625,047 B1 | 9/2003 | Coleman, Jr., deceased |
| 6,630,786 B1 | 10/2003 | Cummings et al. |
| 6,632,698 B1 | 10/2003 | Ives |
| 6,643,069 B1 | 11/2003 | Dewald |
| 6,650,455 B1 | 11/2003 | Miles ................... 359/237 |
| 6,666,561 B1 | 12/2003 | Blakley |
| 6,674,033 B1 | 1/2004 | Wang |
| 6,674,090 B1 | 1/2004 | Chua et al. |
| 6,674,562 B1 | 1/2004 | Miles ................... 359/291 |
| 6,680,792 B1 * | 1/2004 | Miles ................... 359/291 |
| 6,710,908 B1 | 3/2004 | Miles et al. ................. 359/290 |
| 6,741,377 B1 | 5/2004 | Miles ................... 359/243 |
| 6,741,384 B1 | 5/2004 | Martin et al. |
| 6,741,503 B1 | 5/2004 | Farris et al. |
| 6,747,785 B1 | 6/2004 | Chen et al. |
| 6,747,800 B1 | 6/2004 | Lin |
| 6,775,174 B1 | 8/2004 | Huffman et al. |
| 6,778,155 B1 | 8/2004 | Doherty et al. |
| 6,794,119 B1 | 9/2004 | Miles ................... 430/313 |
| 6,811,267 B1 | 11/2004 | Allen et al. |
| 6,819,469 B1 | 11/2004 | Koba |
| 6,822,628 B1 | 11/2004 | Dunphy et al. |
| 6,829,132 B1 | 12/2004 | Martin et al. |
| 6,853,129 B1 | 2/2005 | Cummings et al. |
| 6,855,610 B1 | 2/2005 | Tung et al. |
| 6,859,218 B1 | 2/2005 | Luman et al. |
| 6,861,277 B1 | 3/2005 | Monroe et al. |
| 6,862,022 B1 | 3/2005 | Slupe |
| 6,862,029 B1 | 3/2005 | D'Souza et al. |
| 6,867,896 B1 | 3/2005 | Miles ................... 359/290 |
| 6,870,581 B1 | 3/2005 | Li et al. |
| 6,870,654 B1 | 3/2005 | Lin et al. |
| 6,882,458 B1 | 4/2005 | Lin et al. |
| 6,912,022 B1 | 6/2005 | Lin et al. |
| 2001/0003487 A1 | 6/2001 | Miles ................... 359/260 |
| 2002/0000959 A1 | 1/2002 | Colgan et al. |
| 2002/0015215 A1 | 2/2002 | Miles ................... 359/290 |
| 2002/0021485 A1 | 2/2002 | Pilossof |
| 2002/0024711 A1 | 2/2002 | Miles |
| 2002/0054424 A1 | 5/2002 | Miles |
| 2002/0075555 A1 | 6/2002 | Miles ................... 359/291 |
| 2002/0126364 A1 | 9/2002 | Miles ................... 359/247 |
| 2002/0149828 A1 | 10/2002 | Miles |
| 2003/0043157 A1 | 3/2003 | Miles ................... 345/540 |
| 2003/0072070 A1 | 4/2003 | Miles ................... 359/260 |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0051929 A1 | 3/2004 | Sampsell et al. ............. 359/247 |
| 2004/0058532 A1 | 3/2004 | Miles et al. ................. 438/689 |
| 2004/0080807 A1 | 4/2004 | Chen et al. |
| 2004/0125281 A1 | 7/2004 | Lin |
| 2004/0145049 A1 | 7/2004 | McKinnell et al. |
| 2004/0147056 A1 | 7/2004 | McKinnell et al. |
| 2004/0160143 A1 | 8/2004 | Shreeve et al. |
| 2004/0174583 A1 | 9/2004 | Chen et al. |
| 2004/0175577 A1 | 9/2004 | Lin |
| 2004/0179281 A1 | 9/2004 | Reboa |
| 2004/0179445 A1 | 9/2004 | Park |
| 2004/0207897 A1 | 10/2004 | Lin |
| 2004/0209192 A1 | 10/2004 | Lin |
| 2004/0209195 A1 | 10/2004 | Lin |
| 2004/0212026 A1 | 10/2004 | Van Broklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0240032 A1 | 12/2004 | Miles ................... 359/291 |
| 2004/0240138 A1 | 12/2004 | Martin et al. |
| 2004/0245588 A1 | 12/2004 | Nikkel et al. |
| 2004/0263944 A1 | 12/2004 | Miles et al. ................. 359/290 |
| 2005/0001828 A1 | 1/2005 | Martin et al. |
| 2005/0024557 A1 | 2/2005 | Lin |
| 2005/0038950 A1 | 2/2005 | Adelmann |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0168849 A1 | 8/2005 | Lin |

FOREIGN PATENT DOCUMENTS

| | | |
|---|---|---|
| JP | 05275401 A1 | 10/1993 |
| RO | 157313 | 5/1991 |
| WO | WO 95/30924 | 11/1995 |
| WO | WO 97/17628 | 5/1997 |
| WO | WO 99/52006 A2 | 10/1999 |
| WO | WO 99/52006 A3 | 10/1999 |
| WO | WO 03/007049 A1 | 1/2003 |
| WO | WO 03/069413 A1 | 8/2003 |
| WO | WO 03/073151 A1 | 9/2003 |
| WO | WO 04/006003 A2 | 1/2004 |

WO  WO 04/026757 A2  4/2004

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interfermeter Array," Sensors and Actuators, pp 17-23 (1994).

Conner, "Hybrid Color Display Using Optical Interference Filter Array," SID Digest, pp. 577-580 (1993).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters (Sep. 1994).

Gosch, "West Germany Grabs the Lead in X-Ray Lithography," Electronics, pp. 78-80 (Feb. 5, 1987).

Howard et al., "Nanometer-Scale Fabrication Techniques," VLSI Electronics: Microstructure Science, vol. 5, pp. 145-153 and pp. 166-173 (1982).

Jackson, "Classical Electrodynamics," John Wiley & Sons Inc., pp. 568-573 (date unknown).

Jerman et al., "A Miniature Fabry-Perot Interferometer with a Corrugated Silicon Diaphragm Support," IEEE Electron Devices Society (1988).

Johnson "Optical Scanners," Microwave Scanning Antennas, vol. 1, pp. 251-261 (1964).

"Light over Matter," Circle No. 36 (Jun. 1993).

Miles, "A New Reflective FPD Technology Using Interferometric Modulation," Society for Information Display '97 Digest, Session 7.3.

Newsbreaks, "Quantum-trench devices might operate at terahertz frequencies," Laser Focus World (May 1993).

Oliner et al., "Radiating Elements and Mutual Coupling," Microwave Scanning Antennas, vol. 2, p. 131-194 (1966).

Raley et al., "A Fabry-Perot Microinterferometer for Visible Wavelengths," IEEE Solid-State Sensor and Actuator Workshop, Hilton Head, SC (1992).

Sperger et al., "High Performance Patterned All-Dielectric Interference Colour Filter for Display Applications," SID Digest, pp. 81-83 (1994).

Stone, "Radiation and Optics, An Introduction to the Classical Theory," McGraw-Hill, pp. 340-343 (1963).

Walker, et al., "Electron-beam-tunable Interference Filter Spatial Light Modulator," Optics Letters vol. 13, No. 5, pp. 345-347 (May 1988).

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

Bass, "Handbook of Optics, vol. I, Fundamentals, Techniques, and Design, Second Edition," McGraw-Hill, Inc., New York, pp. 2.29-2.36 (1995).

Giles et al., "A Silicon MEMS Optical Switch Attenuator and Its Use in Lightwave Subsystems," IEEE Journal of Selected Topics in Quantum Electronics, vol. 5, No. 1, pp. 18-25, (Jan./Feb. 1999).

Schnakenberg et al. "TMAHW Etchants for Silicon Micromachining. 1991 International Conference on Solid State Sensors and Actuators-Digest of Technical Papers," pp. 815-818.

Williams et al., "Etch Rates for Micromachining Processing. Journal of Microelectromechanical Systems, vol. 5, No. 4, pp. 256-259," (Dec. 1996).

Winters et al., "The etching of silicon with $XeF_2$ vapor," Applied Physics Letters, vol. 34, No. 1, pp. 70-73, (Jan. 1979).

* cited by examiner

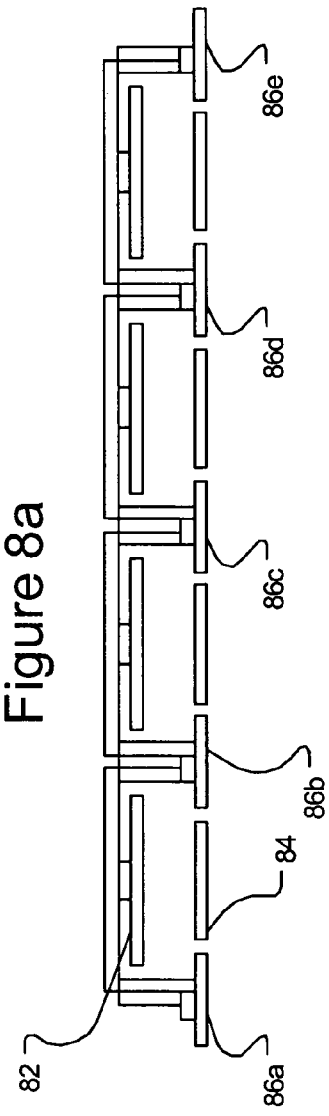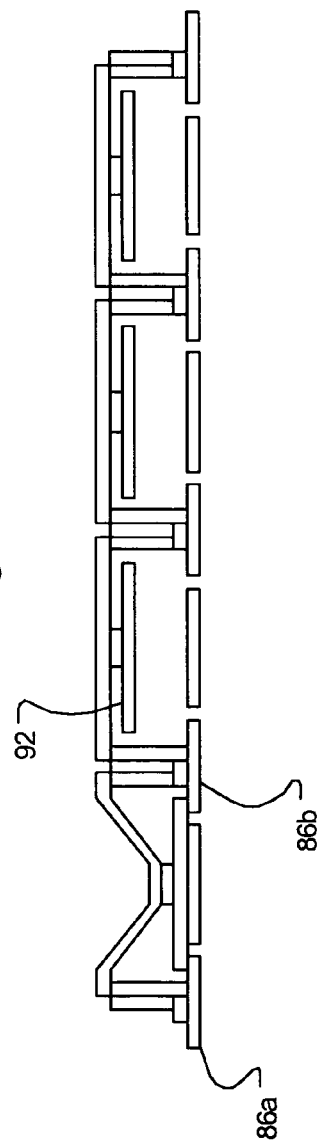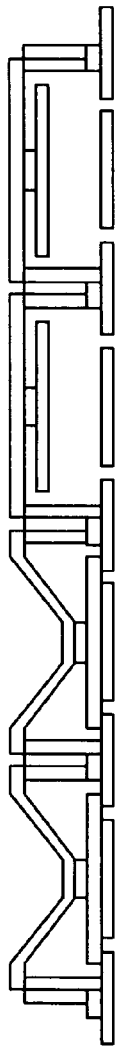

AREA ARRAY MODULATION AND LEAD REDUCTION IN INTERFEROMETRIC MODULATORS

BACKGROUND

Interferometric modulators, such as the iMoD™, modulate light by controlling the self-interference of light that strikes the front surface of the modulator. These types of modulators typically employ a cavity having at least one movable or deflectable wall. This deflectable wall moves through planes parallel to the front wall of the cavity—the wall that is first encountered by light striking the front surface of the modulator. As the movable wall, typically comprised at least partly of metal and highly reflective, moves towards the front surface of the cavity, self-interference of the light within the cavity occurs, and the varying distance between the front and movable wall affects the color of light that exits the cavity at the front surface. The front surface is typically the surface where the image seen by the viewer appears, as interferometric modulators are usually direct-view devices.

Typically, interferometric modulators are constructed of membranes formed over supports, the supports defining individual mechanical elements that correspond to the picture elements (pixels) of an image. In a monochrome display, such as a display that switches between black and white, one element might correspond to one pixel. In a color display, three elements may make up each pixel, one each for red, green and blue. The individual elements are controlled separately to produce the desired pixel reflectivity.

In one example of operation, a voltage is applied to the movable wall of the cavity, causing it be to electrostatically attracted to the front surface which in turn affects the color of the pixel seen by the viewer. A difficulty exists in producing modulators with accurate and repeatable mechanical properties, so that specific applied analog voltages produce specific analog displacements of the movable wall that acts as a mirror at the back of the interferometric cavity. To produce accurate and repeatable color combinations, typical modulators use only binary displacement of the movable mirror. In this mode of operation any given movable mirror-wall will be found at rest in either its quiescent state where it produces one of the color states mentioned above or its fully deflected state where it produces a black optical state.

Thus these binary operated modulators are capable of displaying only two gray levels per pixel, such as black and white in the case of a monochrome modulator, or eight colors per pixel, such as red, green, blue, cyan, yellow, magenta, black, and white for example, in the case of a color modulator. It is desirable to display additional shades of gray in a monochrome display and additional colors in the case of a color display. Since controlling analog deflection of the single monochrome mirror per pixel or three-color mirrors per pixel can be unreasonably difficult it becomes necessary to devise a modulator architecture with a more complex pixel structure.

BRIEF DESCRIPTION OF THE DRAWINGS

Embodiments of the invention may be best understood by reading the disclosure with reference to the drawings, wherein:

FIGS. 8a–8c show an embodiment of electrically cascaded interferometric modulator elements.

DETAILED DESCRIPTION OF THE EMBODIMENTS

Figure 1:
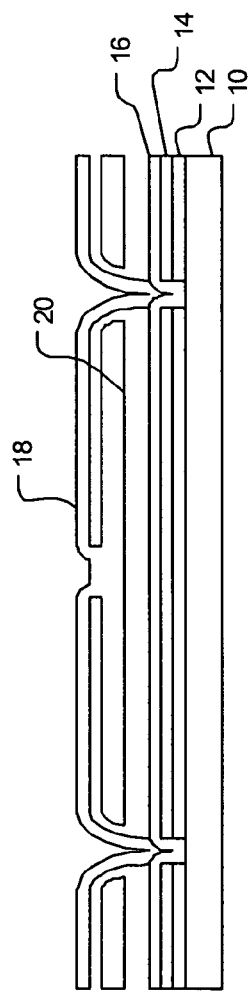
FIG. 1 shows an example of an interferometric modulator.

FIG. 1 shows an example of an interferometric light modulator. This particular example is an iMoD™, but any interferometric modulator may utilize the embodiments of the invention. No limitation or restriction to iMoD™ modulators is implied or intended.

The modulator is typically comprised of an array of individual elements arranged in rows and column. One element shown in FIG. 1 has an electrode layer 12 on a transparent substrate 10, typically glass. One surface 14 of the modulator's optically resonant, interferometric cavity is fabricated on the electrode layer and an oxide layer 16 covers this surface. The parallel surface of the cavity, mirror 20, is suspended above the cavity by supports 18. In operation, when the electrode on the glass substrate is activated, the mirror 20 is electrostatically attracted toward the glass substrate. The deflection of the mirror 20 changes the dimensions of the cavity and causes the light within the cavity to be modulated by interference.

The resulting picture element (pixel) from a direct-view display will be composed of elements such as the one shown in FIG. 1. Each of these modulator elements with the mirror 20 in an undeflected state will be bright, or 'ON.' When the mirror 20 moves to its full design depth into the cavity toward the front surface of the cavity, the change in the cavity causes the resulting pixel to be 'dark' or OFF. For color pixels, the ON state of the individual modulating elements may be white, red, green, blue, or other colors depending upon the modulator configuration and the display color scheme. Most typically a single color pixel will be composed of a number of modulator elements that create interferometric blue light, a similar number of elements that create interferometric red light, and a similar number that create interferometric green light. By moving the mirrors according to display information, the modulator can produce full color images.

The most basic display activates simultaneously all modulator elements of a given color within a pixel with the result being that eight colors per pixel are possible. The current invention provides for the activation within a pixel of some elements of a given color separately from other elements of that same color. This enables multiple intensities of red light, multiple intensities of blue light, and multiple intensities of green light to be mixed within a given pixel. The result is that rather than being limited to 8 colors per pixel the interferometric display is capable of thousands of colors per pixel.

Figure 2:
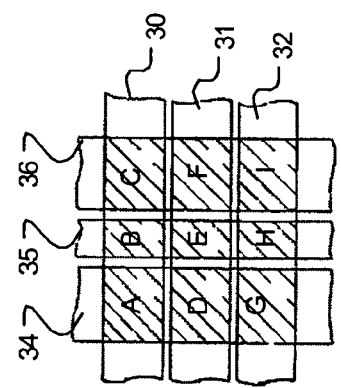
FIG. 2 shows a prior art implementation of an area-ruled LCD modulator pixel, including its corresponding connection leads.

Similar types of area-weighted modulation have been practiced in other types of displays. For example FIG. 2, which corresponds to FIG. 9 in U.S. Pat. No. 5,499,037, shows an area-weighted method. In this example, 16 levels of intensity are provided by creating a subpixel containing 9 separate pixel elements addressed with six electrodes, three formed as horizontal connecting leads and three formed as vertical connecting leads. A full-color pixel formed this way might have 9 vertical leads, three for red, three for green, and three for blue, and the same three horizontal leads shown in FIG. 2. This pixel provides 4096 colors (16×16×16), but with 12 leads it would result in a much more complex display system than would a pixel with four leads providing eight colors.

Because the individual elements of interferometric modulators tend to operate in a binary mode, bright in a quiescent state and dark in a fully deflected state, analog operation is not readily available. Therefore, interferometric modulators are likely to benefit from an area-ruled method of operation. It is one purpose of embodiments of this invention to provide a method of area-ruled operation that is uniquely suited for application to interferometric modulators and which reduces the complexity required by previous implementations.

Figure 3:
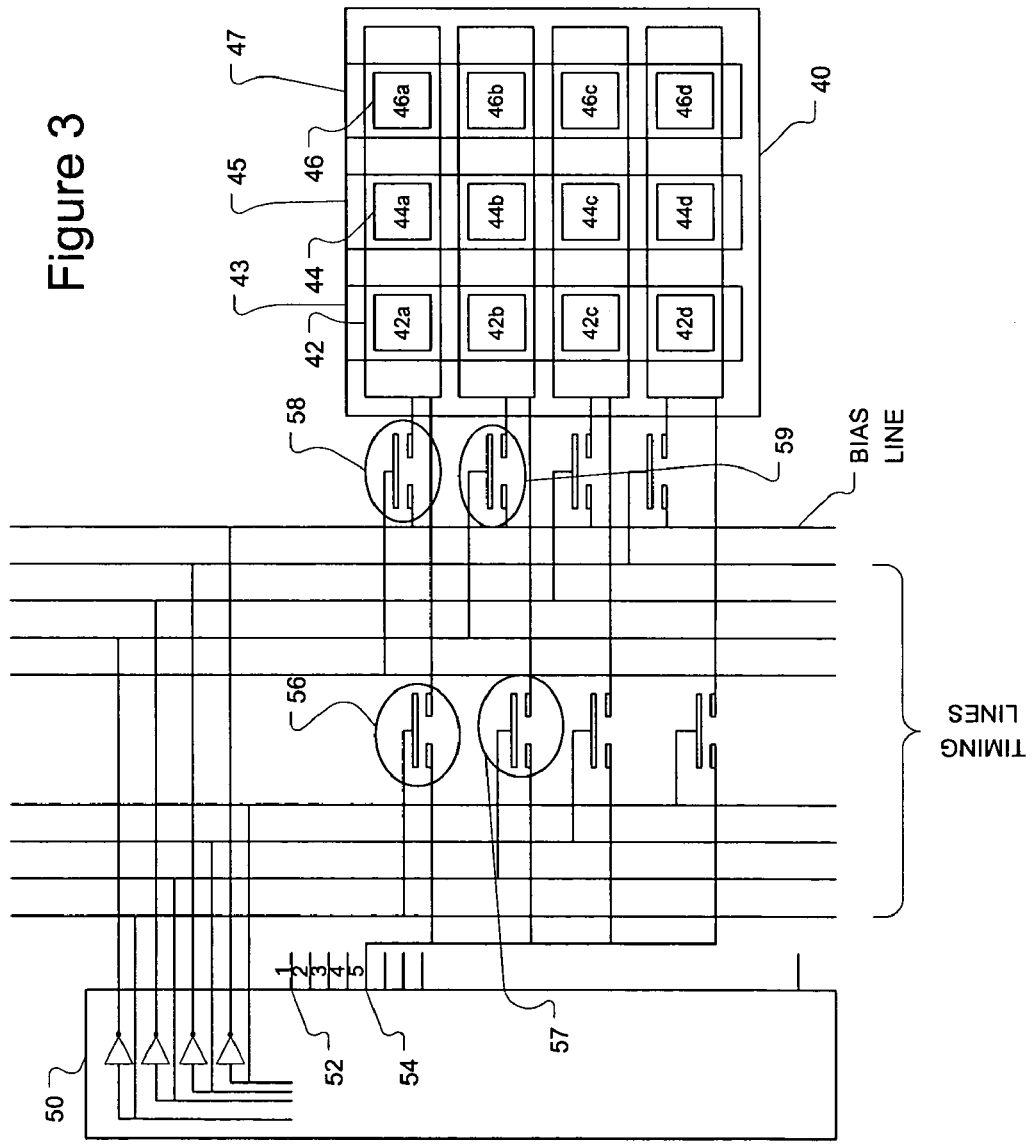
FIG. 3 shows an embodiment of an interferometric modulator using area array modulation having reduced leads.

One embodiment of an interferometric modulator area-ruled architecture requiring fewer pin outs and still providing higher bit depth is shown in FIG. 3. Driver device 50 has one output pin per display row, and a connection line is provided between each driver device output pin and a corresponding row of the modulator array. The single row connection is multiplexed between the sub-elements that comprise the sub-rows of the display element. The term display element has been introduced here to specify a certain area of the entire display surface. The display element is a collection of sub-elements, that typically resolves into a portion of the display presenting a coherent set of image information. The most typical display element would correspond to a single pixel in the resulting image. The display element 40 in FIG. 3 has been divided up into three columns, 42, 44, and 46, typically one for each color such as red, green and blue, in the case where 40 represents a pixel. In addition, each column has been divided up into 4 sub-elements arranged in sub-rows.

To understand how the system in FIG. 3 functions, consider that the row select outputs of driver device 50 typically become active in a sequential pattern starting with output 1, then proceeding to output 2 and so on. When the timing signals cause row 5 to become active, the switch 56 closes and switch 58 becomes open, causing the active driver pin voltage to be applied to the sub-row of sub-elements 42a, 44a and 46a. Simultaneously, the data lines 43, 45, and 47, which may be connected to a driver device not shown in FIG. 3, are driven with the proper voltages to cause the sub-elements 42a, 44a, and 46a to switch to states appropriate to the current image content associated with display element 40.

As soon as sub-elements 42a, 42b, and 42c have reached their newly addressed positions switch 56 opens and switch 58 closes. Immediately thereafter switch 57 closes and switch 59 opens, and the data lines 43, 45, and 47 are driven to the appropriate values for sub-pixels 42b, 44b, and 46b. This sequence continues until the three data lines have been driven with the four different data sets to update the twelve sub-pixels in display element 40. Then this sequence repeats for rows 6, 7, and so on.

As shown in FIG. 3 the timing/switch-activation signals are shared with all other rows throughout the display, so that switches for the first sub-row of every row toggle when the first sub-row of any row is active, and so on for the second, third, and fourth sub-rows. However, only the driver output pin for the active row is energized with the active addressing voltage level. All non-active rows are held to a non-select bias voltage while the active row is elevated to a data select voltage. In this manner, elements in all sub-rows except the active sub-row see the same, non-select voltage independent of the status of the timing signals and consequently independent of the positions of the switches within the sub-row. It should be observed that switching of the non-active, row-select switches could be avoided with masking circuits in cases where ultimate low power consumption is desired As can be seen from FIG. 3, the switches 56 and 58 as well as the other switches connected to the timing signal lines, are manufactured to be microelectromechanical devices similar to the interferometric elements, such as the one shown in FIG. 1. Because the array is undergoing microelectromechanical processing to create the interferometric display elements, manufacturing these 'extra' elements in the area surrounding the array would not create extra complexity or necessarily raise the cost of the device. It is possible that the multiplexing of the sub-rows could be done with other types of switches, including but not limited to microelectromechanical switches fabricated in a manner not similar to the fabrication of the interferometric elements and more conventional electronic switches fabricated using thin silicon films deposited on the modulator's glass substrate.

The term 'similar to' as used here means that the devices have the same basic structure of an electrode, a cavity, and a mirror suspended over the cavity. When constructing an electrical switch, the optical functionality fabricated near the glass substrate in an interferometric modulating element is not required, and it may be desirable to eliminate this optical functionality. It is only required that at full deflection the mirror come in contact with (and hence connect electrically) two conductive areas, most likely fabricated from the thin film layers used to fabricate the addressing electrodes and/or a conductive layer used to form the front wall of the optically resonant cavity. This is different than the way the interferometric element may operate, which is why the switch structure is 'similar to' rather than the same as the display element.

Figure 4:
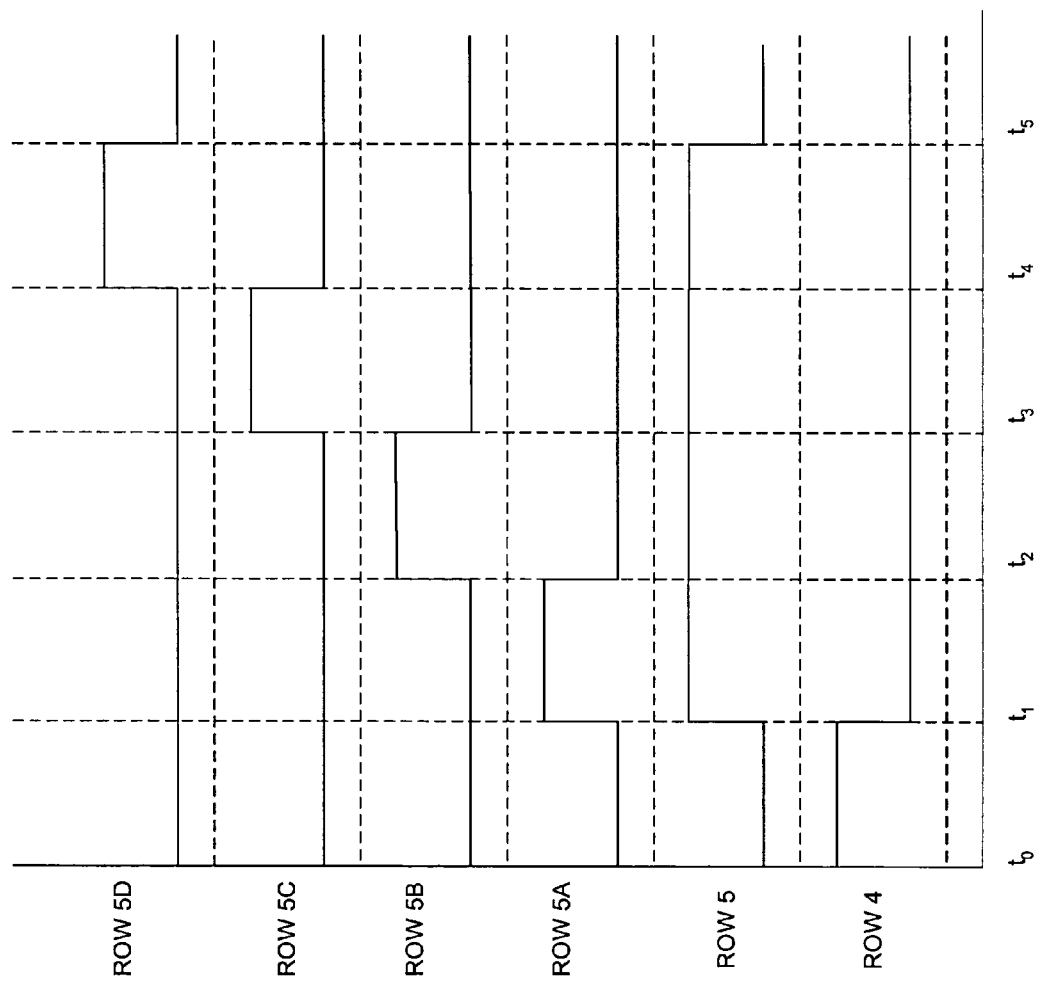
FIG. 4 shows a timing diagram for a multiplexed interferometric modulator.

A timing diagram for one possible operation of row 5 is shown in FIG. 4. At to, the signals for row 4 are high, as seen from the modulator. At $t_1$, the signal for row 4 goes low and row 5 becomes active. Similarly, the line for row 5A becomes active. At $t_2$, row 5A goes low and row 5B becomes active. This continues in series for rows 5C and 5D.

This embodiment results in a reduced number of connections between the array and the driver. The connections necessary to drive the individual sub-elements in the sub-rows are made in the surrounding area of the modulator array, bringing them 'on-chip' with the array, rather than requiring the driver device to provide separate output pins for each sub-element.

Figure 7:
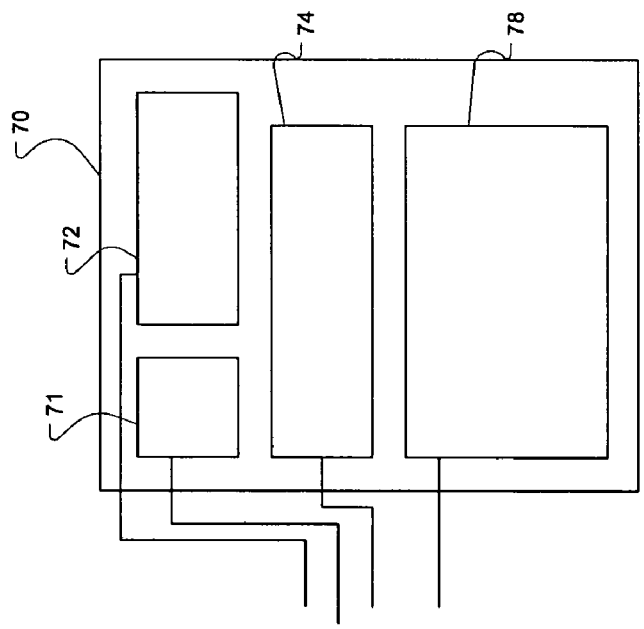
FIG. 7 shows another embodiment of an interferometric modulator using area array modulation.

The sub-elements shown in FIG. 3 have been drawn to be of approximately equal areas. Another useful geometry uses sub-elements with binary 'physical' weighting relative to each other. As can be seen in the display element 70 of FIG. 7, a bit depth of 4 is provided using only 4 such sub-elements. For example, area 78 has a size approximately equal to one-half the full size of display element 70. Sub-element 74 has a size approximately equal to one-half the size of the next largest sub-element, in this case, sub-element 78, giving sub-element 74 a size one-quarter of the full-size display element. Each subsequent sub-element has a size approximately equal to one-half the size of the next largest sub-element. Sub-element 72 is one-half that of 74, or one-eight that of 70. Sub-element 71 is one half of 72, or one-sixteenth of 70.

The elements having different physical sizes are activated as needed to achieve an overall display pixel with a given color intensity. The table below shows the ON sub-elements, by reference number for each color intensity level.

| Color intensity | Sub-elements ON |
|---|---|
| 0 | None |
| 1 | 71 |
| 2 | 72 |
| 3 | 71, 72 |
| 4 | 74 |
| 5 | 71, 74 |
| 6 | 72, 74 |
| 7 | 71, 72, 74 |
| 8 | 78 |
| 9 | 71, 78 |
| 10 | 72, 78 |
| 11 | 71, 72, 78 |
| 12 | 74, 78 |
| 13 | 71, 74, 78 |
| 14 | 72, 74, 78 |
| 15 | 71, 72, 74, 78 |

Although described here as being addressed by the multiplexing technique of FIG. 3 this implementation of area weighting can be used separately from the multiplexing technique described above. Increased interconnection complexity will result, but this relatively low level of complexity will be acceptable in many systems.

In an alternative embodiment, the bit depth of 4 is achieved by dividing each sub-column for a display element into 16 ($2^4$) sub-elements. Each set of 16 sub-elements in each sub-column are connected together in a cascading fashion and are therefore referred to as 'sub-element cascades.' The individual cascaded sub-elements may be fabricated to serve as both interferometric modulating elements and electrical switches such as those shown in FIG. 3. Alternatively, each individual interferometric sub-element may have an electrical switch immediately adjacent.

Figure 5:
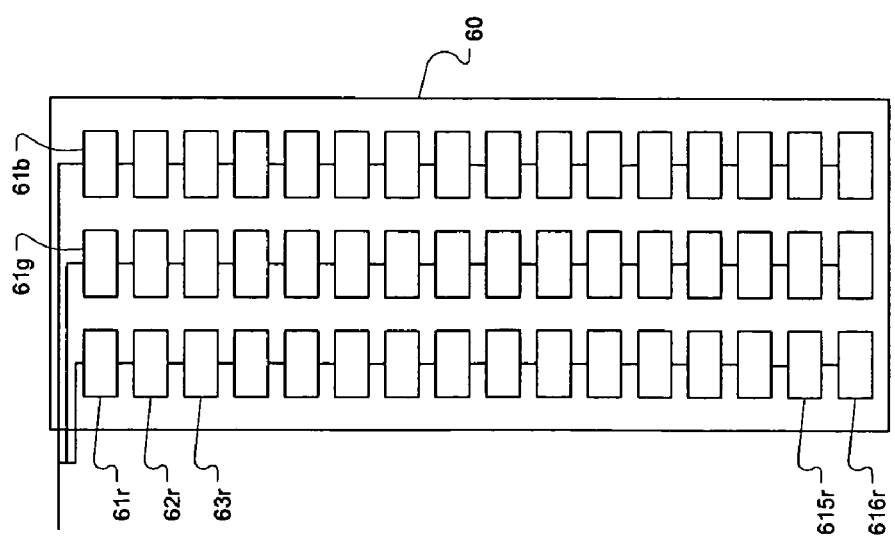
FIG. 5 shows another embodiment of an interferometric modulator using area array modulation having reduced leads.

An example of a display element 60 having sub-element cascades for 4 bits of depth is shown in FIG. 5. The three column lines connect to the first element in a sub-element cascade; sub-element 61r is the first element in the red cascade, 61g in the green cascade and 61b in the blue cascade, the last elements being 615r and 616r for the red cascade. The control of color intensity is provided by the width of an addressing pulse applied to the column line. This may be best understood by looking at two possible sub-element configurations shown in FIG. 8 and FIG. 9.

In FIG. 8a sub-element members of a sub-column, such as the sub-elements 61r, 62r, and 63r shown in FIG. 5, are shown in cross-section. The interferometric cavity is defined by the suspended, movable mirror elements such as 82 and the front surface optical film stacks such as 84. In this case the suspended movable element also functions as the contactor of a switch as did the switches shown in FIG. 3. Arrayed within each sub-element, adjacent to the optical film stack, are conductive elements 86a–86e. When the movable mirror 82 comes in contact with the optical film stack 84 the sub-element has switched from one optical state to a second optical state. Additionally, a circuit is completed, since the movable mirror now connects conductor 86a to conductor 86b.

The sub-element cascade is addressed by applying one polarity of an address voltage to the moving mirror 84 and the fixed contact 86a. The second polarity of the address voltage is applied to an electrode within or below the optical film stack 84. The resultant potential difference causes mirror 82 to deflect, completing the connection between conductor 86a and 86b as shown in FIG. 8b. With the first voltage polarity now applied to conductor 86b (through mirror 82), mirror 92 will eventually deflect as shown in FIG. 8c. This process will continue until all of the cascaded mirrors have collapsed or until the address pulse is removed. Thus the reflective intensity of the display element is controlled by controlling the time duration (or pulse width) of the address pulse.

Figure 6:
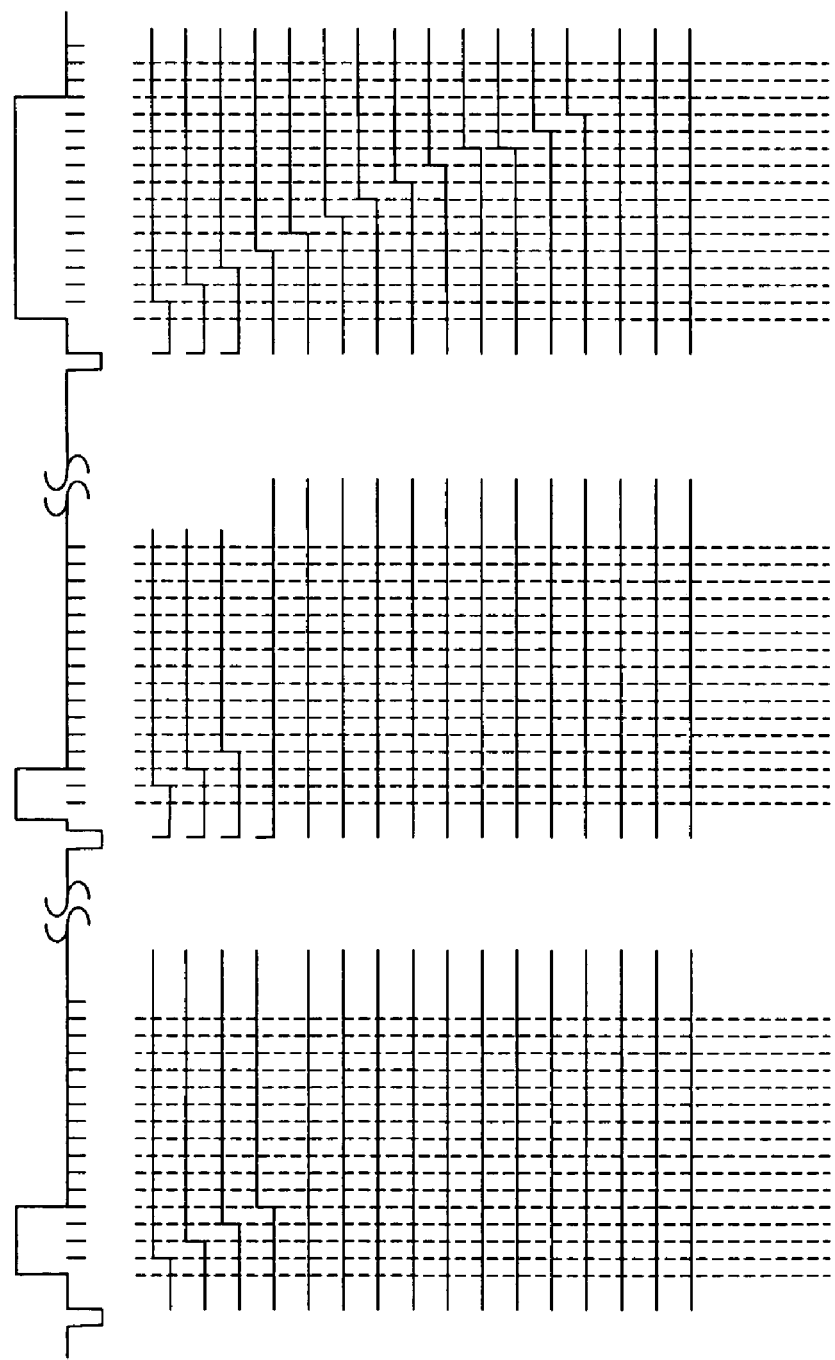
FIG. 6 shows a timing diagram for an interferometric modulator using equally weighted regions.

FIG. 6 shows a timing diagram for three successive addressing sequences of a sub-element cascade with color values of 12, 13, and 3 respectively. A color value of 0 is 'black' or OFF, and a color value of 16 would represent all sub-elements of the cascade being on. The addressing pulse is shown in the top line. As can be seen, as the time duration of the address pulse increases more mirror elements are activated, moving into the 'black' or OFF state. During the first address pulse, four elements move into the 'black' state, and a color value of 12 is achieved—12 elements are left in the bright state. Taken in light of FIG. 5 this might correspond to sub-elements 61r, 62r, 63r, and 64r switching successively to the 'black' state.

During the second addressing, the address pulse is shorter, and only three elements switch to the 'black' state. In the final addressing, 13 elements switch to the 'black' state leaving a fairly dark reflectance color value of three. The discontinuity in the timing diagram represents the relatively long period (typically a 'frame time' in video terms) that the mirrors remain in their addressed states. It is during this integration time that the viewer's eye becomes impressed with the area weighted intensity value.

At the end of each frame time, FIG. 6 shows that all of the mirrors are reset to their quiescent position before being addressed again. It is possible to address the interferometric device so that this reset is not necessary. It is included here to emphasize the switching operations that take place during each 'line time' of addressing. It should be noted that the address pulse must exceed a certain minimum time duration in order to cause the first element in a sub-element cascade to turn ON. A very short addressing pulse, such as a transient signal, that is shorter than the response time of the sub-elements, will not cause the first sub-element to switch.

Once the address pulse has been active long enough for the first sub-element to switch, the addressing signal is 'passed on' to the next element in the array. Again, the address pulse must be active long enough past the switching of the first element to cause the second element to switch. As the response times of the sub-elements are assumed to be approximately the same, the sub-element cascade should be controllable to provide a desired number of sub-elements to turn ON while providing a relatively high immunity to spurious signals. The cumulative effect is to cause the display element to form the proper color intensity in the resultant pixel. In this manner, a display element with a bit density of 4 was made possible without any extra connection lines or extra connections from the driver device.

Figure 9:
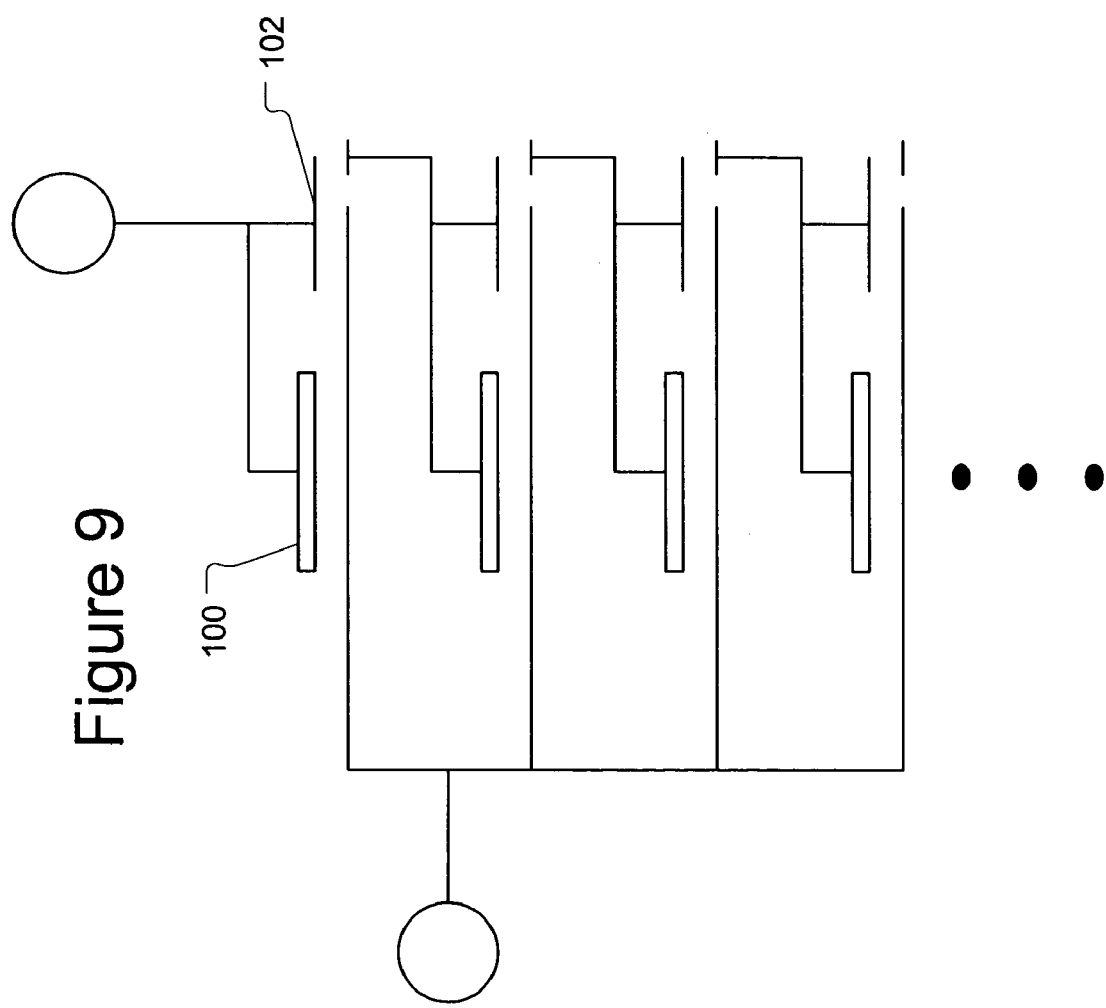
FIG. 9 shows an embodiment of deflectable elements similar to interferometric modulator elements used as switches.

The cascade effect described above is based upon movable mirror elements that provide both the optical function of the display as well as the electrical switching cascade itself. An alternative, shown in FIG. 9, is to provide adjacent to each interferometric sub-element such as 100 a separate electrical switch such as 102 that toggles simultaneously with the optical element. The embodiment of FIG. 9 shows a micromechanical switch, but other types of switches, such as silicon or other semiconductor transistor switches may be used as well. In this way the parameters of the optical element and the parameters of the electrical element can be separately optimized. The addressing waveforms and color value results of the system of FIG. 9 are identical to those provided by the system of FIG. 8. The systems of FIGS. 8 and 9 are both examples of obtaining different levels of bit-depth by controlling the behavior of the modulator over time.

Figure 10:
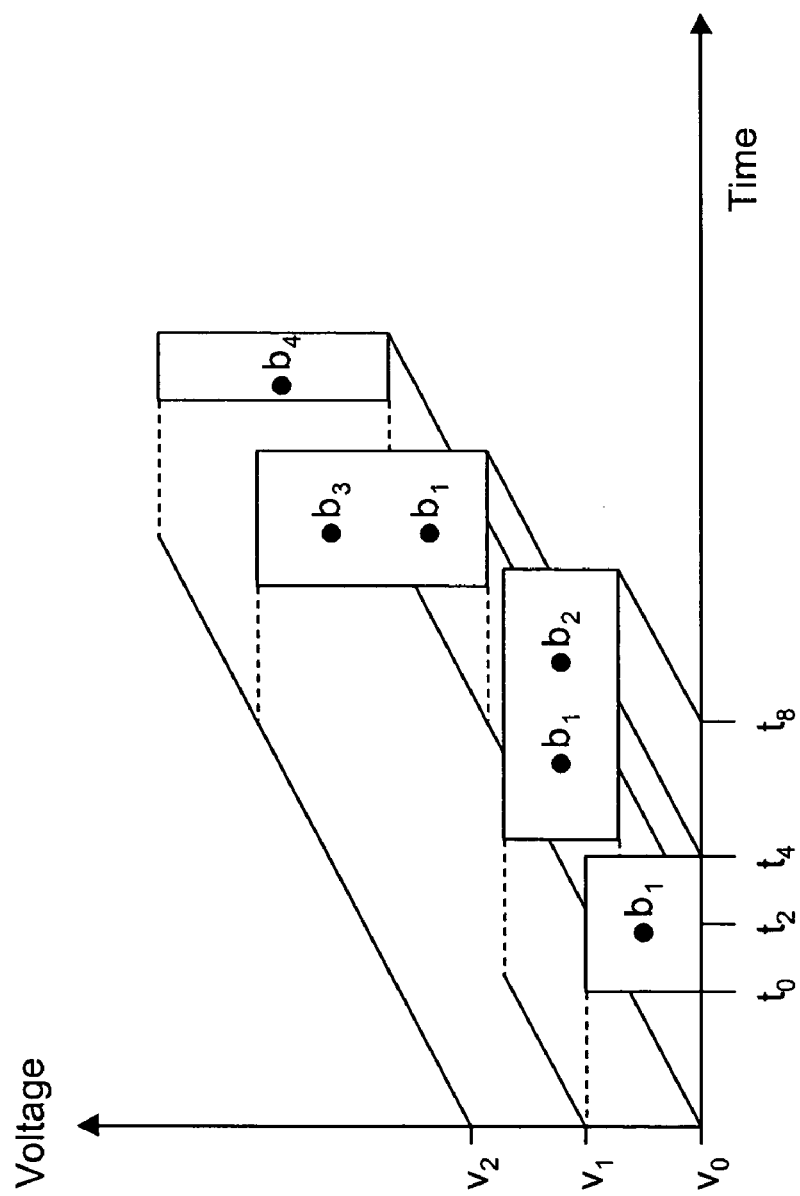
FIG. 10 shows a graph illustrating how deflectable elements can be selectively addressed by varying amplitude and duration of voltage pulses.

In FIG. 10 a graph is provided to illustrate that by varying the time duration of addressing pulses as well as the voltage levels of those pulses a more refined control of movable mirror addressing for bit-depth switching can be implemented. FIG. 10 applies to a display element consisting of several individual moving mirrors. The mirrors are denoted by the names $b_1$, $b_2$, $b_3$, etc. The mechanical support structure of the mirrors as well as the mirror element themselves can be manufactured using a number of different techniques, such as varying film thickness and residual stress within the film, to allow individual mirrors to deflect at different rates versus time and at different displacements versus applied voltage.

As shown in FIG. 10 movable element b, deflects after a short application of voltage $V_1$. Mirror $b_2$ responds more slowly and will activate after a longer application of $V_1$. Both mirrors b1 and b3 will respond to a brief application of $V_2$, and mirror $b_4$ is capable of responding to a very quick application of $V_2$ to which none of the other mirrors can respond. In this way various combinations of mirrors can be deflected by shaping address pulses in the time/voltage space, where the term 'combination' includes the switching of a single element. If these mirrors have different areas, such as the areas shown in FIG. 7, then multiple brightness levels can be achieved by addressing a multi-segment display element with a single pair of electrical connections.

In all of these manners, alternative methods of providing intensity bit depths far beyond a single bit can be accomplished for interferometric elements. While the implementations above were discussed with regard to a bit-depth of 4, having 16 levels of color intensity, these embodiments may be employed for any bit-depth greater than 1.

Thus, although there has been described to this point particular embodiments for a method and apparatus for area array modulation and reduced lead count in interferometric modulators, it is not intended that such specific references be considered as limitations upon the scope of this invention except in-so-far as set forth in the following claims.

What is claimed is:

1. A light modulator, comprising:
   an array comprising rows and columns of interferometric display elements, each element being divided into sub-rows of one or more sub-elements;
   array connection lines to transmit operating signals to the display elements, wherein one connection line corresponds to one row of display elements in the array;
   sub-array connection lines electrically connected to each array connection line; and
   switches to transmit the operating signals from each array connection line to the sub-rows to effect image data modulation.

2. The light modulator of claim 1, wherein said one or more sub-elements further comprise a sub-element in each row for red, green and blue.

3. The light modulator of claim 1, wherein said array connection lines further comprise three column connection lines, one each for red, green and blue sub-elements in each element.

4. The light modulator of claim 1, wherein the switches further comprise microelectromechanical switches.

5. The light modulator of claim 1, wherein the switches further comprise switches of a similar configuration as the interferometric display elements.

6. The light modulator of claim 1, wherein the switches further comprise the sub-elements such that when a selected sub-element is deflected, the selected sub element causes the operating signal from the array connection line to transfer from the selected sub-element to an adjacent sub-element.

7. The light modulator of claim 1, wherein the switches further comprise semiconductor transistor switches.

8. A method of manufacturing an interferometric light modulator, the method comprising:
   providing an array of interferometric display elements arranged in rows and columns, each display element comprising:
      a predetermined number of sub-rows of sub-elements, wherein the predetermined number of sub-rows depends upon a desired bit-depth for a display; and
      a predetermined number of sub-columns within each sub-row, wherein the predetermined number of sub-columns corresponds to a desired number of colors for the display;
   arranging array connection lines for each row, such that each connection line corresponds to one row of the array; and
   providing electrical connection between the array connection line for each row to one of the sub-rows of the corresponding row of the array.

9. The method of claim 8, wherein said arranging array connection lines for each row further comprise arranging array connection lines between the array and a driver device.

10. The method of claim 8, wherein said providing electrical connection between the array connection line further comprise providing connection to a set of micro electromechanical switches.

11. The method of claim 10, wherein the microelectromechanical switches further comprise switches of a similar configuration as the interferometric display elements.

12. The method of claim 8, wherein said providing electrical connection between the array connection line further comprise providing connection to a set of semiconductor switches.

13. The method of claim 8, wherein said providing electrical connection further comprise deflecting a sub-element of a sub-row, thereby forming a connection between the sub-element and an adjacent sub-element.

14. A light modulator, comprising:
   an array of interferometric display elements arranged in rows and columns, each element comprising a predetermined number of sub-elements, wherein the number of sub-elements is determined by a desired bit depth and each element is approximately the same size; and an array connection line corresponding to each row of display elements, wherein each array connection line is electrically connected to a sub-element in each display element;

wherein at least one sub-element is configured to selectively form an electrical connection connecting said array connection line to at least one other sub-element.

15. A light modulator, comprising:

an array of interferometric display elements arranged in rows and columns, each element comprising a predetermined number of sub-elements, wherein the number of sub-elements is determined by a desired bit depth and each element is approximately the same size;

electrical connections between the sub-elements such that the electrical connections form a sub-element cascade; and an array connection line corresponding to each row of display elements, wherein each array connection line is electrically connected to a sub-element in each display element;

wherein each element comprises a predetermined number of sub-elements cascades, and the predetermined number of cascades corresponds to the number of colors in the element.

16. A light modulator, comprising:

an array of interferometric display elements arranged in rows and columns, each element comprising a predetermined number of sub-elements, wherein the number of sub-elements is determined by a desired bit depth and each element is approximately the same size;

electrical connections between the sub-elements such that the electrical connections form a sub-element cascade;

an array connection line corresponding to each row of display elements, wherein each array connection line is electrically connected to a sub-element in each display element; and addressing circuitry to provide an addressing pulse to each sub-element cascade, wherein a number of sub-elements in the cascade that become active depends upon a length of the addressing pulse.

17. A method of manufacturing a light modulator, comprising:

providing an array of interferometric display elements arranged in rows and columns, each element comprising at least one sub-element cascade of a predetermined number of sub-elements, such that at least one sub-element is configured to selectively form an electrical connection connecting said array connection line to at least one other sub-element; and electrically connecting a first element in each sub-element cascade in a row to a corresponding connection line for that row.

18. The method of claim 17, further comprising electrically connecting the connection lines for each row to a driver device.

19. A method of manufacturing a light modulator, comprising:

providing an array of interferometric display elements arranged in rows and columns, each element comprising at least one sub-element cascade for each of a desired color comprising a predetermined number of sub-elements; and electrically connecting a first element in each sub-element cascade in a row to a corresponding connection line for that row.

20. A light modulator, comprising:

an array of interferometric elements, each element comprising a pre-determined number of sub-elements, each sub-element comprising a single movable layer having a surface area, wherein the surface area corresponds to a different binary weight of display information, and wherein the number of sub-elements depends upon a desired bit depth.

21. The light modulator of claim 20, wherein at least one interferometric element comprises four sub-elements, a first sub-element of a size approximately one half the size of said at least one element, a second sub-element of a size approximately one fourth the size of said at least one element and third sub element of a size approximately one eighth the size of said at least one element and a fourth sub-element of a size approximately one sixteenth the size of said at least one element.

22. The light modulator of claim 20, further comprising a connection line for each of the sub-elements.

23. The light modulator of claim 20, wherein the movable layer comprises a mirror.

24. A light modulator, comprising:

an array of interferometric elements, each element comprising a pre-determined number of sub-elements, wherein one or more of the sub-elements are of a different size corresponding to a different binary weight of display information, wherein the number of sub-elements depends upon a desired bit depth; and one connection line for each display element, and a set of switches electrically connected between the display element and the sub-elements, wherein the light modulator is configured such that sub-elements needed to create a weighting of a pixel are activated in accordance with display information.

25. A method of manufacturing a light modulator, the method comprising:

providing an array of interferometric display elements;

forming sub-elements within each display element of a size approximately equal to one half a the display element; and forming additional sub-elements as desired, each additional sub-element having a movable layer having a surface area approximately equal to half the surface area of a next largest movable layer of another sub-element.

26. The method of claim 25, further comprising forming a connection line for each sub-element.

27. The method of claim 25, further comprising forming a connection line for each display element and providing multiplexing switches in electrical connection between the connection line and the sub-elements.

28. The method of claim 25, wherein the movable layer comprises a mirror.

* * * * *